United States Patent [19]

Solvang

[11] Patent Number: 4,493,337

[45] Date of Patent: Jan. 15, 1985

[54] DEVICE ON A VALVE FOR SHUTTING OFF AND/OR CONTROLLING A FLOW OF LIQUID

[76] Inventor: Egil S. Solvang, Postdamveien 15, N-Oslo 11, Norway

[21] Appl. No.: 450,147

[22] Filed: Dec. 15, 1982

Related U.S. Application Data

[63] Continuation of Ser. No. 212,741, filed as PCT NO 80/00011, Apr. 1, 1980, published as WO 80/02171, Oct. 16, 1980, § 102(e) date Dec. 3, 1980, abandoned.

[30] Foreign Application Priority Data

Apr. 6, 1979 [NO] Norway .................................. 791170

[51] Int. Cl.³ .......................... F16K 15/04; F16K 5/06
[52] U.S. Cl. ............................... 137/449; 137/DIG. 2; 251/309; 251/181
[58] Field of Search .................. 137/DIG. 2, 449; 251/309, 181, 175

[56] References Cited

U.S. PATENT DOCUMENTS

| | | | |
|---|---|---|---|
| 500,944 | 7/1893 | Pickel | 137/269.5 X |
| 2,011,601 | 8/1935 | Williams | 137/DIG. 2 |
| 2,650,059 | 8/1953 | Hjulian et al. | 137/449 X |
| 4,072,291 | 2/1978 | Adams | 137/DIG. 2 |

Primary Examiner—Arnold Rosenthal
Attorney, Agent, or Firm—Holman & Stern

[57] ABSTRACT

Device on a valve for shutting and/or controlling a flow of liquid, consisting of a valve box with a chamber, to which is connected an inlet and an outlet and with a valve body in the form of a ball or cylinder so arranged as to be capable of displacement with a rolling motion from a closed position against a valve seat to an open position away from the seat. The valve is specifically intended for use as a tank valve in toilet (water-closet) cisterns. The ball is supported so as to move freely in a blind hole in a body which is cylindrical and which is supported so as to rotate in the chamber. The body may be moved from a position where the blind hole and the ball are above the valve seat to a position where these components are to one side of the seat. The blind hole is so arranged as to be approximately at right angles to the longitudinal axis of the body, and the valve seat is situated inside the valve box or in a component which is attached to it.

2 Claims, 3 Drawing Figures

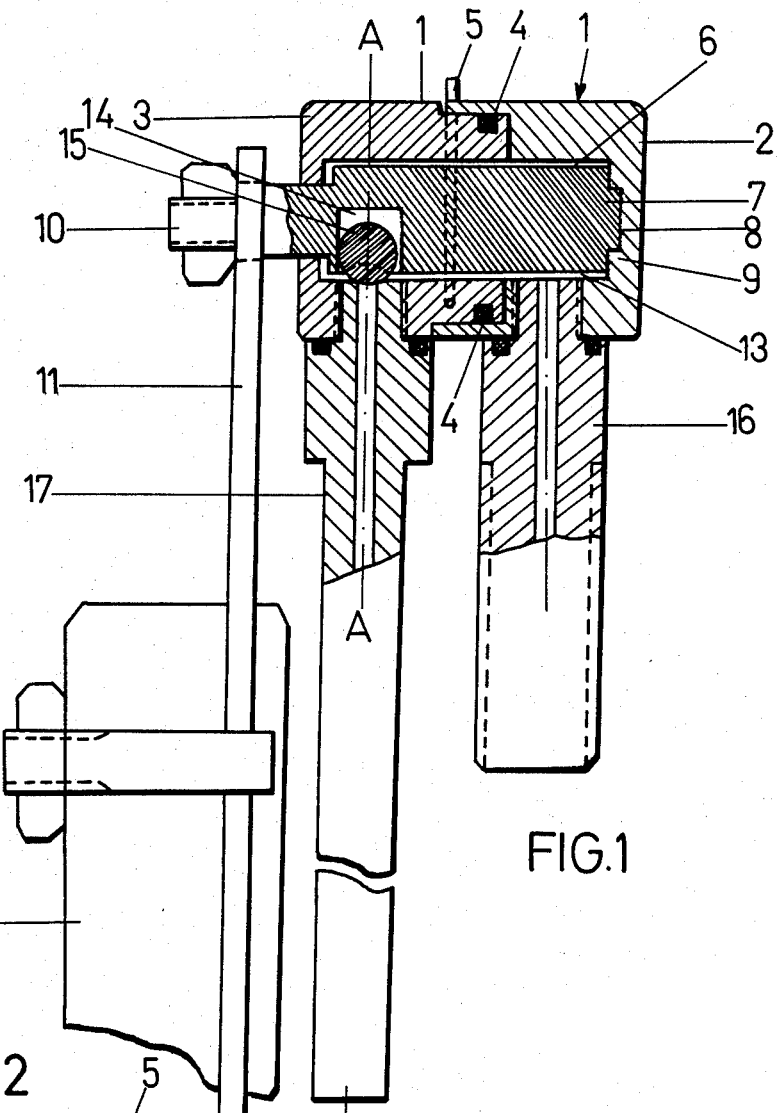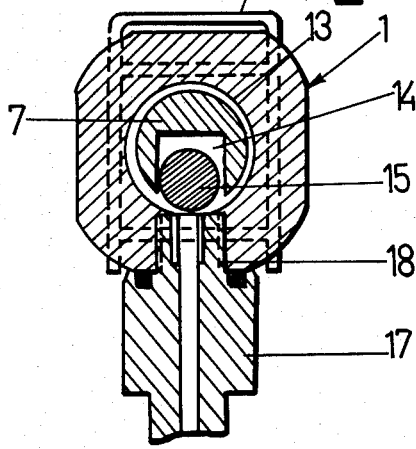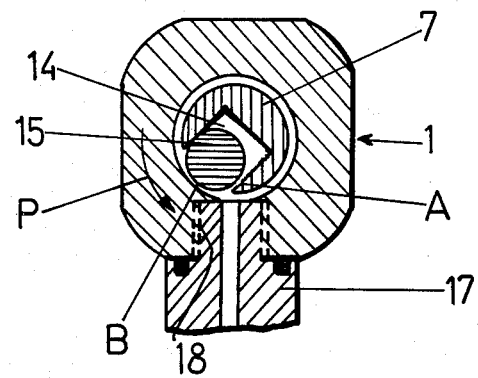

DEVICE ON A VALVE FOR SHUTTING OFF AND/OR CONTROLLING A FLOW OF LIQUID

This is a continuation of application Ser. No. 212,741, filed Dec. 03, 1980 which in turn is now abandoned.

CROSS REFERENCE TO RELATED APPLICATION

The invention of this application is disclosed in corresponding International Application No. PCT/N080/00011 filed 1 April 1980, the benefit of which is being claimed.

BACKGROUND OF THE INVENTION

1. Field of the Invention

The present invention relates to a device on a valve for shutting off and/or regulating a flow of liquid, intended specifically to be used as the tank on toilet (water closet) cisterns.

2. Description of the Prior Art

In valves used for shutting off a flow of liquid, every effort is made to produce a valve which will cause the least possible noise in the pipework as it closes, and which will prevent impact between the valve body and the valve seat. This is a difficult problem, particularly in the case of valves for toilet (water closet) cisterns, where the closing action is relatively slow.

A valve is known from French Pat. No. 1,371,834, in which a free-moving ball acts as the valve body, and may be rolled to and from its closed position against the valve seat by mechanical means, e.g. a rod. A valve is known from U.S. Pat. No. 3,238,965, in which either a ball or a cylinder is enclosed in a depression and is forced into either an open or closed position against a valve seat.

SUMMARY OF THE INVENTION

The present invention is based on the method described in the two publications referred to above for the manufacture of a valve which is particularly suitable for use as a tank valve in toilet (water closet) cisterns. The aim is thus to produce a valve which will operate as quietly as possible, which will close without any impact occurring between the valve body and the valve seat, which will allow the cistern to fill at the most constant rate possible irrespective of the supply pressure, which is cheap to produce, strong and reliable, and which may be readily adapted to suit bottom-inlet or side-inlet tanks, and with the outlet either below or above the water level inside the tank.

This is achieved in accordance with this invention by means of a device on a valve for shutting off and/or controlling a flow of liquid, consisting of a valve box with a chamber to which are connected an inlet and an outlet, together with a valve body in the form of a ball or a cylinder so arranged as to be capable of rolling from a closed position against the valve seat to an open position away from the seat, and vice versa, intended specifically to be used as the tank valve on toilet (water closet) cisterns, with the characteristic features of the invention consisting of the following:

(a) that the ball is so positioned as to move freely in a blind hole in a body;
(b) that the body containing the blind hole is cylindrical and is supported so as to rotate in the chamber;
(c) that the body may be moved from a position where the blind hole and the ball are above the valve seat to a position where these components are to one side of the seat;
(d) that the blind hole is so arranged as to be approximately at right angles to the longitudinal axis of the body, and
(e) that the valve seat is situated inside the valve box or in a component which is attached to it.

One further characteristic feature of the invention is that the body containing the blind hole exhibits a clearance in relation to the walls of the chamber of such a size that an annular chamber is formed, and that the inlet is led into this annular space. One further characteristic feature is that the blind hole is of such a depth that it will at least hold practically the entire ball. The clearance provided between the ball and the walls of the blind hole shall be such that the liquid under pressure is free to flow into the space in the blind hole behind the ball.

According to one embodiment of the invention, the valve is characterized in that the valve box is divided transversely to the longitudinal axis into two parts which are joined together so as to be liquidtight and in such a way that the two parts may be set at an angle to each other and may be locked in the desired positions.

One further feature of the invention is that the valve seat is formed at the end of the outlet pipe which passes entirely inside as far as the wall of the valve chamber, and that the valve seat is in the form of a cylindrical hole at the end of the outlet pipe, said hole being lined with rubber or with some similar elastic material.

The valve in accordance with this invention is very simple and cheap to manufacture. The complete valve basically consists of three parts, namely the valve block with the valve chamber, the movable body with its recess, and the valve body in the form of a ball or cylinder. In the above-mentioned practical embodiment the valve box is divided transversely into two parts so that the parts may be set at an angle to each other in such a way that by so doing the relative angle between the inlet connection and the outlet connection may be varied at will. Tests have shown the valve to operate practically without noise and without impact.

BRIEF DESCRIPTION OF THE DRAWINGS

The invention is described below in greater detail with reference to the drawing, wherein FIG. 1 illustrate an embodiment of the valve in accordance with the invention shown in plan view and in section;

FIG. 2 is a cross-sectional view taken along line A—A in FIG. 1, with the valve in its closed position; and FIG. 3 is a cross-sectional view taken along line A—A in FIG. 1, but with the valve in its open position.

DETAILED DESCRIPTION OF THE INVENTION

The valve in accordance with this embodiment comprises a valve box 1 shown in two halves 2, 3 which have a graduated joint face and which are sealed by means of a seal 4. The two halves 2 and 3 may be locked together by means of a locking ring 5 which runs in grooves in the two halves of the valve box. For example, in the case of the half 3, two sets of grooves may be positioned at 90° to each other so that the parts may be turned and locked in relation to each other at intervals of 90°.

The valve box 1 has a circular chamber 6 in which a cylindrical body 7 is supported so that it is free to rotate, one end of which is supported with the aid of a dowel 8 which engages in a blind hole 9. At the other end is an axle journal 10 which runs in a hole in the end wall of the valve box 1. To this axle journal 10 is attached a float arm 11 with a float 12. The body 7 is smaller in diameter than the chamber 6, so that an annular chamber 13 is formed between the wall of the chamber 6 and the outer circumference of the body 7. In the body 7 is bored a radial blind hole 14 in which is located a rather smaller ball 15. The valve box 1 has an inlet pipe 16 which leads to the annular space 13. Also connected to the valve box 1 is an outlet pipe 17 in the area of the blind hole 14 with the ball 15. The end of the outlet pipe 17 reaches all the way into the annular space 13 and forms the valve seat for the ball 7. In order to provide a pliable and wall-sealing seating, the inner end of the outlet pipe 17 is lined at its mouth with rubber or a similar material 18.

The valve operates as follows.

Water reaches the valve through the inlet pipe 16 which leads to the annular space 13, in such a way that this is full of water at all times. With the valve closed, there is a static build-up of water pressure in the blind hole 14 behind the ball, such that the ball is held firmly in place against the valve seat which is formed by the lining 18. Thus greater pressure is present above the ball than below the ball. When the tank is emptied of water, the float drops and the body 7 turns in such a way that the ball 15 is moved away from its closed position against the valve seat 18, as shown in FIG. 3 for instance. As the tank is filled, the body 7 turns in the direction indicated by the arrow P and the ball is moved gently to the closed position, as may be seen in FIG. 2. The ball will be seen to rest against two points A and B, of which the former is a point of contact between the shell of the ball and the internal wall of the bore 14, and the latter point B is the point of contact between the shell of the ball and the internal wall of the hollow space 6 in the valve box 1. Full static pressure is present above the ball, and this pressure will ensure that full contact is made against the two points referred to above during the entire closing action. Vibration of the ball is thus avoided during the closing action, whereby impact during the actual closing is also avoided.

As mentioned above, tests have shown that this valve causes very little noise whilst the tank is being filled. It is presumed that this may have to do with the fact that the flow of water through the inlet pipe 16 passes into the annular space 13, which has a very large "wet surface area".

As may be seen from the drawing, only very minor sealing problems are encountered with the valve in accordance with the invention. The only possible point of leakage is at the lead-in of the axle journal 10. This passageway is, however, effectively sealed by means of a teflon seal which is forced into a sealing position by the pressure of the water.

The reason why the fact that the inlet and the outlet can be set at an angle relative to each-other is of such importance is that the regulations which apply in different countries place different requirements on such valves. There are also variations in the different models of toilet, and plumbers in certain countries have specific requirements for ease of installation. In the setting of the valve illustrated in FIG. 1, in which the inlet and the outlet are parallel, the valve has been set for installation in the base of the tank. In this case, the inlet pipe 16 is extended and passes through a sealed opening in the base of the tank. The outlet pipe 17 will then of course lie underwater. In this way, comparatively noiseless filling and ease of installation are achieved. Other countries prefer side installation with the outlet under water. The ring 5 is removed and the valve half 2 is turned through 90°, whereupon the ring is replaced so that the halves 2 and 3 are locked together in that position. Inlet 16 may now be installed in an opening in the side of the tank. The outlet 17 will be under the water in the tank. A European Economic Community requirement exists for the outlet to be located above the surface of the water. In side installations, the valve should be turned through a further 90° so that the inlet and the outlet lie end to end. With the outlet above the water and with the inlet at the bottom of the tank, the valve box may be locked so that the inlet and the outlet form an angle of 90° to each other.

As may be seen from the drawing, the valve in accordance with the invention is extremely simple to manufacture and therefore inexpensive. It may be moulded entirely in plastic, and the design does not require close tolerances to be set. The one important requirement is that the blind hole 14 should be of rather larger diameter than the ball 15. The valve is also very reliable in use, since there are no narrow passageways which can become choked and no precise tolerances which can be affected by the ravages of time.

The invention is not restricted to the embodiment described in the drawing and in the above. The body 7 is shown in the drawing as a rotating body. It would be easy to imagine a modification in which the body is displaced axially. Nor is the invention restricted to tank valves, but may conceivably be used in all applications where there exists a requirement to shut off or to control a flow of water or of some other liquid.

Having described my invention, I claim:

1. An assembly for controlling the flow of water in a toilet tank cistern comprising:

a water-tight two-piece valve box in said cistern having a fluid inlet communicating with a source of pressurized fluid, a fluid outlet communicating with the cistern, and a cylindrical chamber for supporting a valve body permitting fluid communication between said inlet and said outlet;

a cylindrical valve body supported for axial rotation within said chamber by means of a dowel at one end thereof engaging a recess in said valve box and a journal at the other end thereof passing through a corresponding aperture in said valve box, said valve body being of sufficiently small diameter to permit fluid communication between said inlet and said outlet;

a valve assembly comprising: a blind hole in said valve body positioned for alignment with said fluid outlet; a displaceable ball valve freely movable within said blind hole; said blind hole being of a depth so that it will at least hold the entire ball and the walls of said blind hole being such that the liquid under pressure is free to flow into a space in the blind hole behind the ball; and a valve seat adapted to receive said ball valve and form a closure therewith, said valve seat being positioned at the point of intersection of said cylindrical chamber and said fluid outlet;

a float device within the cistern operatively associated with the journal of said cylindrical valve body so that the raising or lowering of said float device rotates said valve body about its axis within said chamber between a first position wherein said blind hole overlies said fluid outlet and a plurality of other positions wherein said bore is displaced from said first position;

whereby when the valve body is displaced from its first position fluid enters the cylindrical chamber through the inlet, passes between the walls of the chamber and the cylindrical valve body, and exits from the chamber through the outlet, and when the valve body returns to its first position the low pressure in the outlet compared to the higher pressure in the chamber causes the ball valve to positively sit on the valve seat and close the outlet.

2. The assembly of claim 1 wherein said two piece valve box comprises a first piece through which the fluid outlet communicates with the chamber and a second piece through which the fluid inlet communicates with the chamber, said pieces being joined in a watertight joint and being rotatable with respect to each other, so that the fluid inlet may enter the chamber at any angle in a given plane.

* * * * *